United States Patent Office 3,290,377
Patented Dec. 6, 1966

3,290,377
CATALYTIC REDUCTION OF NITRO COMPOUNDS TO AMINES
Herbert R. Appell, Pitcairn, Pa., assignor to Koppers Company, Inc., a corporation of Delaware
No Drawing. Original application July 11, 1963, Ser. No. 294,254. Divided and this application May 14, 1965, Ser. No. 456,004
4 Claims. (Cl. 260—580)

This invention relates to a novel class of hydrogenation catalysts. In one specific aspect, it relates to a copper salt-amine complex catalyst and the use of this catalyst for the reduction of organic nitro-compounds. This application is a division of my copending application Serial No. 294,254, filed July 11, 1963, now abandoned.

The amines which are prepared using the catalyst of the invention have well-established industrial uses. For example, aniline and the substituted anilines provided by the catalytic reduction using the novel catalyst complex are useful in the manufacture of dyes, medicinals, resins, varnishes, perfumes, and shoe blacks. The anilines are also useful as solvents and in the vulcanizing of rubber.

Heretofore, numerous methods have been used in the reduction of organic nitro-compounds to the corresponding amines. One of the best known amination processes is the preparation of aniline from nitrobenzene using metallic iron in acidic or neutral solutions as illustrated by the equation:

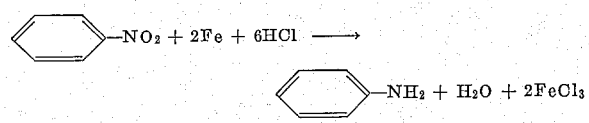

However, the use of metallic iron is disadvantageous because of the mechanical difficulty and expense of separating the desired product from the inorganic salts formed during the reduction step. In recent years, the direct hydrogenation of nitro-compounds using hydrogen and heterogeneous catalysts has come into relatively wide use. The latter method suffers the disadvantage of requiring relatively pure nitro-compounds as starting materials in order to prevent catalyst poisoning. This same disadvantage is present in other systems which employ heterogeneous catalysts.

Quite surprisingly, I have discovered a novel homogeneous catalyst system and a method of reducing organic nitro-compounds therewith. The new catalyst is unusual in that it is highly selective for the reduction of nitro groups to amino groups. The use of this catalyst permits the reduction of nitro-compounds without the reduction of olefinic double bonds or keto groups which may be present in the molecule. Further, the novel catalyst does not remove halogens present in the molecule during the reduction of the nitro groups.

Therefore, it is an object of the present invention to provide a homogeneous catalyst system for the reduction of organic nitro-compounds.

It is a further object of the present invention to prepare organic amines by reducing organic nitro-compounds in the presence of a novel homogeneous catalyst system.

In accordance with the present invention, I have discovered a homogeneous catalyst for reducing organic nitro-compounds with carbon monoxide comprising an aqueous solution of a copper salt-amine complex having a copper salt portion of the formula: CuX, wherein X is a member selected from the group consisting of oxide, hydroxide, carbonate, and an anionic residue of an organic acid, and an organic amine portion of the formula: R—$NH_2$ wherein R is a member selected from the group consisting of amino lower alkyl, diamino lower alkyl, hydroxy lower alkyl, and hydrogen.

Further, I have discovered a method for reducing organic nitro-compounds comprising reacting at an elevated temperature up to the boiling point of the reaction mixture, an organic nitro-compound of the formula: R'—$NO_2$ wherein R' is a member selected from the group consisting of lower alkyl, phenyl, lower alkyl phenyl, alkoxy phenyl, halophenyl, carboxyphenyl, and naphthyl with carbon monoxide in the presence of a catalytic amount of the homogeneous catalyst set forth above.

For the purposes of definition, in the heterogeneous system, the catalyst and the substance to be catalyzed are not in the same physical state. The catalyst may, for example, be a solid while the reacting substances are gases or liquids. On the other hand, for a true homogeneous system, the catalyst and the reacting substances are not separated from each other by a phase boundary at which the catalytic reaction has its seat, both being uniformly distributed in the system. In the homogeneous systems, the catalyst function in the form of single molecules which are distributed among the molecules of the reactants, both being either a gas or a liquid.

Homogeneous catalysts useful in my invention are aqueous solutions of complexes formed by the reactions of copper compounds with certain amines. The most active catalysts are prepared from copper oxide, copper hydroxide, copper carbonate, and copper salts of weak organic acids, e.g., copper acetate, copper formate, copper propionate, and copper benzoate. Copper salts of strong acids such as copper sulfate and copper chloride are less effective since these compounds produce a considerably reduced reaction rate.

The amines which are most useful are all relatively strong bases. The two main characteristics of the amines, useful in the present invention, are that they form complexes with the copper salts and that their aqueous solution have a pH of at least ten. Typical amines useful in preparing the homogeneous catalyst complex are: ethylenediamine, 1,2-propanediamine, 1,3-propanediamine, 3,3-diaminopropylamine, 1,6-hexanediamine, monoethanolamine, and ammonia.

The catalyst complex is composed of at least two moles of amine per mole of copper salt and desirably the amine is present in a substantial excess of this amount. When the molar concentration of amine is decreased below the minimum requirement, the copper salt disproportionates to metallic copper and cupric salts.

Most organic nitro-compounds are readily reduced to the corresponding amines when suspended in the novel aqueous homogeneous catalyst solution while carbon monoxide is bubbled through the reaction mixture. Typical organic nitro-compounds are: nitromethane, nitrobenzene, p-nitroanisole, o-chloronitrobenzene, and p-nitrobenzoic acid, and 1-nitronaphthalene. A simple test for determining whether a particular organic nitro-compound is reducible according to my method is to treat the catalyst solution with carbon monoxide until the deep color of the copper complex disappears and then add the organic nitro-compound to be reduced. If the original color of the copper complex reappears, the compound is reducible with carbon monoxide in the presence of the homogeneous catalyst system.

The minimum amount of the catalyst complex required for the reduction of the organic nitro-compounds, calculated on the basis of the copper salt, is 0.05 mole per mole of organic nitro-compound and preferably a minimum of 0.2 mole per mole of organic nitro-compound should be used for good conversion in a reasonable period of time. There is no theoretical upper limit on the amount of catalyst used. The reaction proceeds smoothly in the presence of a relatively large excess of catalyst, and no detrimental effects are observed. Thus, in a continuous operation, the amount of catalyst present may advantageously be 5–10 moles calculated on the basis of the copper salt per mole of nitro-compound.

The homogeneous catalyst requires a preliminary activation treatment. The copper salt-amine complex catalyst is inactive until it has been treated with carbon monoxide. During the activation the copper ion is reduced to the cuprous state and the catalyst should thereafter be kept away from air or oxidizing agents. If the reduced form of the catalyst becomes deactivated by oxidation, it is merely necessary to pass carbon monoxide through the solution to reactivate the catalyst.

The reaction temperature required ranges up to about the boiling point of the reaction mixture, i.e., about 100° C. Although the reaction occurs at moderate temperatures at atmospheric pressure, temperatures of 75–100° C. are preferred. If temperatures above 100° C. are desired, it is necessary to use superatmospheric pressure to keep the volatile components from escaping.

Generally, the reaction is run at atmospheric pressure to superatmospheric pressure up to about 100 atmospheres. It is, at times, desirable to use superatmospheric pressure which increases the solubility of carbon monoxide and also maintains ammonia in solution at higher temperatures. However, subatmospheric pressure decreases the solubility of carbon monoxide and should be avoided.

The novel homogeneous catalyst systems gradually lose activity as carbon dioxide reacts with the amine component of the catalyst. If the carbonated amine is a useful item it may be recovered and replaced with a fresh supply of amine. Ammonia, for example, forms ammonium carbonate which can be recovered and converted to urea. Ethylenediamine carbonate can be converted to ethylene urea which has utility as a creaseproofing agent in cloth. If by-products of this type are not desired, sodium hydroxide may be added to the aqueous catalyst solution in sufficient quantity to react with the carbon dioxide liberated during the reduction of the organic nitro-compound.

The catalysts of this invention also show some activity when hydrogen is used in place of carbon monoxide. Reaction rates, however, are considerably slower than those obtained with carbon monoxide. When mixtures of carbon monoxide and hydrogen are used, the carbon monoxide reacts much more rapidly than the hydrogen and pure hydrogen may be recovered.

My invention is further illustrated by the following examples.

*Example I*

Aqueous solutions containing two percent copper acetate and varying contents of ethylenediamine were prepared and tested for their effectiveness in reducing nitrobenzene to aniline with carbon monoxide. Fifty ml. of the catalyst solution was placed in a vertical glass tube with two ml. of nitrobenzene. The reaction tube was placed in a water bath at 85° C. and carbon monoxide was bubbled through the tube for six hours. The reaction mixture was diluted to 200 ml. with water and extracted with ethyl ether. After evaporation of the ether the composition of the product was determined by vapor phase gas chromatography. Table I lists the conversions obtained with several concentrations of ethylenediamine.

TABLE I.—EFFECT OF ETHYLENEDIAMINE CONCENTRATION ON ANILINE YIELD

| Ethylenediamine (percent): | Aniline yield (percent) |
|---|---|
| 4 | 10 |
| 10 | 20 |
| 50 | 50 |
| 90 | 90 |

*Example II*

A variety of amines were compared for their effectiveness in the copper salt-amine catalyst. The procedure of Example I was followed except with the experiment using ammonia. In the experiment with ammonia the copper was added as the carbonate and the experiment was run under two atmosphere pressure. Unless noted otherwise the concentration of amine was 50 percent.

TABLE II.—EFFECT OF AMINE ON ANILINE YIELD

| Amine | Time (Hours) | Aniline (Percent) |
|---|---|---|
| Ethylenediamine | 5 | 50 |
| 1,2-propanediamine | 8 | 20 |
| 1,3-propanediamine | 7 | trace |
| 3,3'-diaminopropylamine | 5 | 85 |
| 1,6-hexanediamine | 7 | 11 |
| Triethylenetetramine | 5 | 16 |
| Piperazine | 4 | 10 |
| Monoethanolamine (98 percent) | 3 | 43 |
| Ammonia (2 atmosphere pressure) | 6 | 33 |

*Example III*

Following the procedure of Example I, the effect of copper acetate concentration on catalytic activity was determined. The ethylenediamine concentration was held constant at ten percent. The results are tabulated in Table III.

TABLE III.—EFFECT OF COPPER CONCENTRATION ON YIELD OF ANILINE

| Copper Acetate (Percent) | Time (Hours) | Aniline (Percent) |
|---|---|---|
| 0.0 | 5 | None |
| 0.4 | 5 | Trace |
| 1.2 | 7 | 3 |
| 4.0 | 3 | 33 |

*Example IV*

A number of organic compounds were reduced in a stream of carbon monoxide at 85° C. for five hours with a catalyst consisting of an aqueous solution containing four percent copper acetate and 50 percent ethylenediamine. The compounds and their reduction products are listed in Table IV.

TABLE IV.—REDUCTION OF VARIOUS COMPOUNDS

| Starting material: | Product |
|---|---|
| p-Nitroanisole | p-Anisidine. |
| o-Chloronitrobenzene | o-Chloroaniline. |
| p-Nitrobenzoic acid | p-Aminobenzoic acid. |
| 1-nitronaphthalene | 1-aminonaphthalene. |
| Nitromethane | Methylamine. |
| Cumene hydroperoxide | Cumyl alcohol. |

*Example V*

Fifty ml. of 50 percent aqueous ethylenediamine was saturated with carbon dioxide. Five grams each of copper carbonate, sodium hydroxide, and nitrobenzene were then added (0.25 M NaOH, 0.0406 M nitrobenzene). The resulting solution was placed in a Parr low pressure shaker, and carbon monoxide added to a pressure of 14.5 p.s.i.g. and the temperature raised to 91° C. After 3.75 hours, the organic layer was separated and found to be 100 percent aniline by chromatographic analysis. The peak height indicated that no by-products had been formed.

I claim:

1. A method of reducing organic nitro-compounds comprising reacting, at an elevated temperature up to the boiling point of the reaction mixture, an organic nitro-compound of the formula: $R'NO_2$, wherein $R'$ is a member selected from the group consisting of lower alkyl, phenyl, lower alkylphenyl, lower alkoxyphenyl, chlorophenyl, and naphthyl, with carbon monoxide in the presence of an aqueous solution, having a pH of at least ten, of at least 0.05 mole per mole of said organic nitro-compound of a copper salt-amine complex catalyst consisting essentially of
  (a) a copper salt of the formula CuX, wherein X is a member selected from the group consisting of oxide, hydroxide, carbonate, and the anionic residue of a weak organic acid, and
  (b) an amine of the formula: R—$NH_2$, wherein R is a member selected from the group consisting of amino lower alkyl, diamino lower alkyl, hydroxy lower alkyl, and hydrogen,
said complex containing at least two moles of said amine per mole of said copper salt.

2. A method according to claim 1 wherein R is amino lower alkyl, R' is phenyl, and X is the anionic residue of an organic acid.

3. A method of making aniline comprising reacting nitrobenzene with carbon monoxide at a temperature of 75–100° C. and in the presence of an homogeneous catalyst consisting essentially of an aqueous solution, having a pH of at least ten, of a copper acetate-ethylenediamine complex wherein the molar ratio of said ethylenediamine to said copper acetate is at least two to one.

4. A method of making aniline comprising reacting nitrobenzene with carbon monoxide at a temperature of 75–100° C. and at a pressure up to 100 atmospheres in the presence of a homogeneous catalyst consisting of an aqueous solution, having a pH of at least ten, of a copper carbonate-ammonia complex wherein the molar ratio of said ammonia to said copper carbonate is at least two to one.

No references cited.

CHARLES B. PARKER, *Primary Examiner*.

R. V. HINES, *Assistant Examiner*.